US010623342B2

(12) United States Patent
Clarke et al.

(10) Patent No.: US 10,623,342 B2
(45) Date of Patent: Apr. 14, 2020

(54) SYSTEM AND METHOD FOR INTEGRATING MESSAGING NETWORK AND EXTERNAL SERVICE PROVIDERS

(71) Applicant: KIK INTERACTIVE INC., Kitchener (CA)

(72) Inventors: Malcolm Clarke, Waterloo (CA); Christopher Best, Kitchener (CA); Michael Mackenzie, Kitchener (CA); Laura Newton, Kitchener (CA); Craig Gurnik, Kitchener (CA); Aleem Haji, Waterloo (CA)

(73) Assignee: KIK INTERACTIVE INC., Kitchener, Ontario (CA)

( * ) Notice: Subject to any disclaimer, the term of this patent is extended or adjusted under 35 U.S.C. 154(b) by 423 days.

(21) Appl. No.: 15/285,989

(22) Filed: Oct. 5, 2016

(65) Prior Publication Data
US 2017/0244652 A1 Aug. 24, 2017

Related U.S. Application Data

(60) Provisional application No. 62/297,458, filed on Feb. 19, 2016.

(51) Int. Cl.
*H04L 12/58* (2006.01)
*H04L 29/08* (2006.01)
*H04L 29/06* (2006.01)

(52) U.S. Cl.
CPC .............. *H04L 51/02* (2013.01); *H04L 51/18* (2013.01); *H04L 67/306* (2013.01); *H04L 67/02* (2013.01); *H04L 67/42* (2013.01)

(58) Field of Classification Search
CPC ...................................................... H04L 51/02
See application file for complete search history.

(56) References Cited

U.S. PATENT DOCUMENTS

| 9,940,352 | B1* | 4/2018 | Satapathy | .............. G06Q 30/00 |
| 2011/0230213 | A1* | 9/2011 | Shah | ........................ H04L 51/38 455/466 |
| 2014/0243028 | A1* | 8/2014 | Colombo | ................ H04W 4/12 455/466 |

* cited by examiner

*Primary Examiner* — Suraj M Joshi
(74) *Attorney, Agent, or Firm* — Gowling WLG (Canada) LLP; Neil W. Henderson (57) ABSTRACT

A system for integrating messaging network and external service providers includes: a messaging server connected to a network; and an integration server connected to the messaging server via the network. The messaging server routes messages between client devices, and autonomously generate responses to messages received from the client devices, by selecting content based on the messages and sending the content to the client devices. The content identifies a web page hosted at the integration server. The integration server receives a request for the web page from a client device, and sends the web page, including at least one selectable element, to the client device. Responsive to receiving a selection of the selectable element from the client device, the integration server transmits a message command to the client device, for causing the client device to transmit a message to the messaging server containing a web page identifier.

18 Claims, 9 Drawing Sheets

SYSTEM AND METHOD FOR INTEGRATING MESSAGING NETWORK AND EXTERNAL SERVICE PROVIDERS

CROSS-REFERENCE TO RELATED APPLICATIONS

This application claims priority to U.S. Provisional Patent Application No. 62/297,458, filed Feb. 19, 2016, the content of which is incorporated herein by reference.

FIELD

The specification relates generally to network communications, and specifically to a method, system and apparatus for system and method for integrating a messaging network and external service providers.

BACKGROUND

A wide variety of data and services are available to client computing devices such as mobile phones, tablet computers and the like. Generally, such data and services are hosted at a variety of corresponding servers. As a result, obtaining even closely related data and services on behalf of a client device may require extensive and independent communications between the client device and a plurality of servers, resulting in inefficient use of computational resources such as network bandwidth.

SUMMARY

According to an aspect of the specification, a system is provided, including: a messaging server connected to a network; and an integration server connected to the messaging server via the network; the messaging server configured to: route messages between a plurality of client devices; and autonomously generate responses to at least one of the messages received from at least one of the client devices, by selecting content based on the at least one message and sending the content to the at least one client device; the content identifying a web page hosted at the integration server; the integration server configured to: receive a request for the web page from the at least one client device; responsive to receiving the request, send the web page, including at least one selectable element; responsive to receiving a selection of the selectable element from the client device, transmit a message command to the client device, for causing the client device to transmit a message to the messaging server containing a web page identifier.

BRIEF DESCRIPTIONS OF THE DRAWINGS

Embodiments are described with reference to the following figures, in which.

DETAILED DESCRIPTION OF THE EMBODIMENTS

Figure 1:
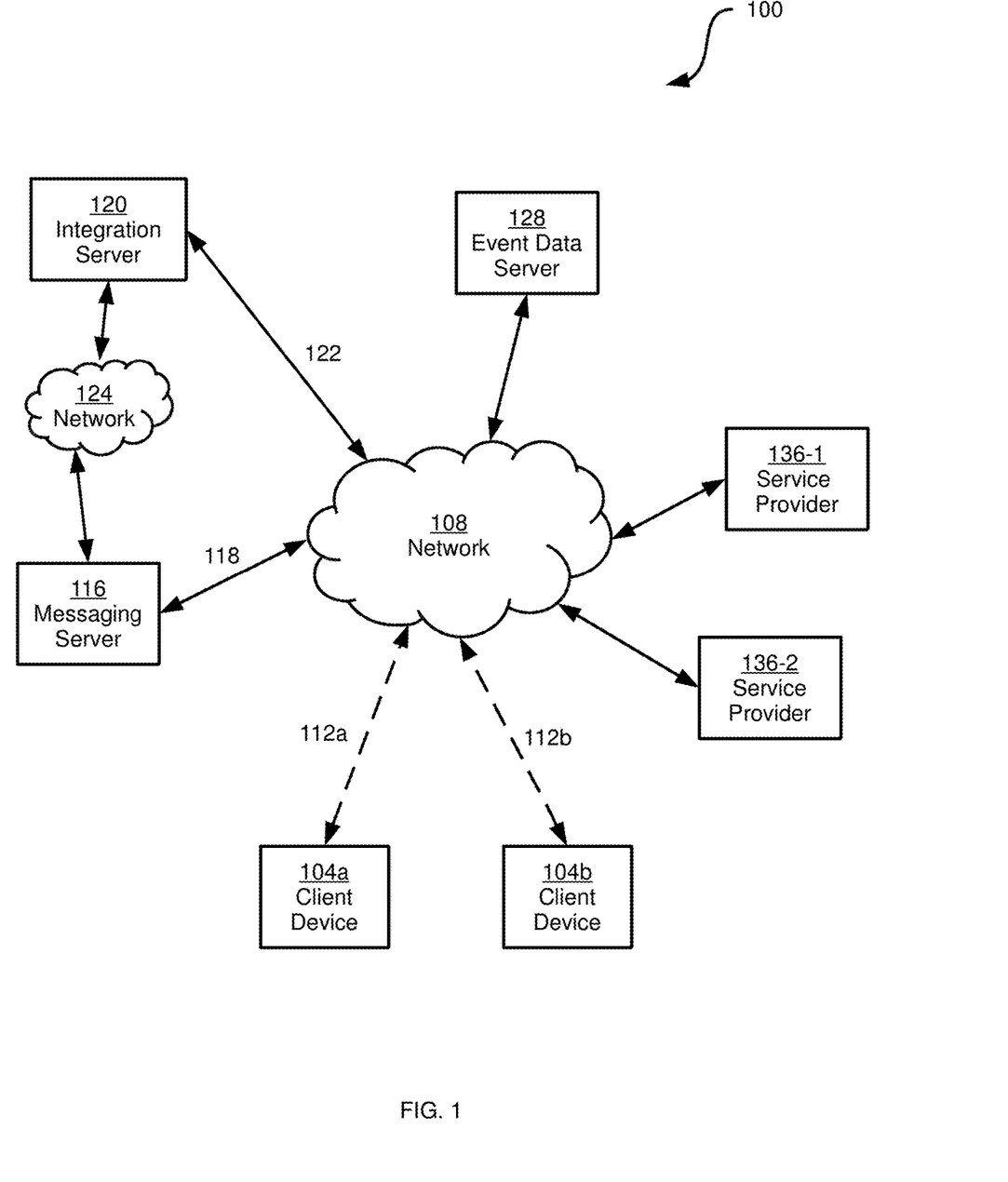
FIG. 1 depicts communications system, according to a non-limiting embodiment.

FIG. 1 depicts a communications system 100 for integrating a messaging network with one or more external service provider systems. System 100 includes a plurality of client computing devices, of which two examples are shown in the form of mobile computing devices 104a and 104b (also referred to herein as client devices 104a and 104b, collectively as client devices 104, and generically as a client device 104). Additional mobile computing devices (not shown) can be included in system 100. Client devices 104 can each be any of a cellular phone, a smart phone, a tablet computer, and the like. More generally, client computing devices 104 can also include desktop computers, tablet computers, laptop computers and the like.

Client devices 104 are connected to a network 108 via respective links 112a and 112b, which is illustrated in FIG. 1 as a wireless link but can also be a wired link, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, WiFi networks, LTE networks and the like.

Via network 108, each client device 104 can communicate with a messaging server 116 connected to network 108 via a link 118 (which in the present example is a wired link). Messaging server 116 provides a messaging service to client devices 104. For example, each client device 104 can execute a messaging application for sending and receiving messages to and from other client devices via messaging server 116. Such messages can include instant messages (e.g. Extensible Messaging and Presence Protocol (XMPP) and Internet Protocol-based messages), Short Message Service (SMS) messages, Multimedia Messaging Service (MMS) messages and the like. In other words, messaging server 116 relays messages between users of the messaging service.

System 100 also includes an integration server 120 connected to network 108 via a link 122 (which in the present example is a wired link). Integration server 120 can additionally be connected to messaging server 116 via a second network 124, such as a LAN. That is, in certain embodiments messaging server 116 and integration server 120 can be co-located. In other embodiments, network 124 can be omitted. As will be described in further detail herein, integration server 120 intermediates between client devices 104, via messaging server 116, and the remaining components of system 100, introduced below.

In addition, system 100 includes an event data server 128. Event data server 128, in general, stores data defining a plurality of events. In the embodiments discussed herein, the events are movie showings. Such events are defined by the location of the theatre playing the movie, the name of the movie, times and dates, and the like. Events can also be categorized (e.g. by movie genre). An example of event data server 128 is a server operated by Gracenote™. A variety of other events, and thus of other event data, will also now occur to those skilled in the art.

Further, system 100 includes at least one service provider server 136. In the present example, two such servers 136-1 and 136-2 are shown. Service provider servers 136, in general, receive requests for various services (e.g. from client devices 104) and transmit instructions to other devices (not shown) to provide the requested services. For example, in the embodiments discussed herein, service provider server 136-1 receives and processes requests to purchase tickets to the events defined by the data hosted at server 128, while service provider server 136-2 receives and processes requests for a transportation service (e.g. taxi dispatching). Other service provider servers 136 are also contemplated, but not shown in FIG. 1, including (but not limited to) purchasing services for movie theatre concession stands.

In general, messaging server 116 and integration server 120 operate and interact to supply client devices 104 with event data sourced from server 128, and to permit client devices 104 to request the services managed by service provider servers 136. Before the functionality of system 100 is described in greater detail, a description of certain internal components of integration server 120 and messaging server 116 will be provided, with reference to FIG. 2.

Figure 2:
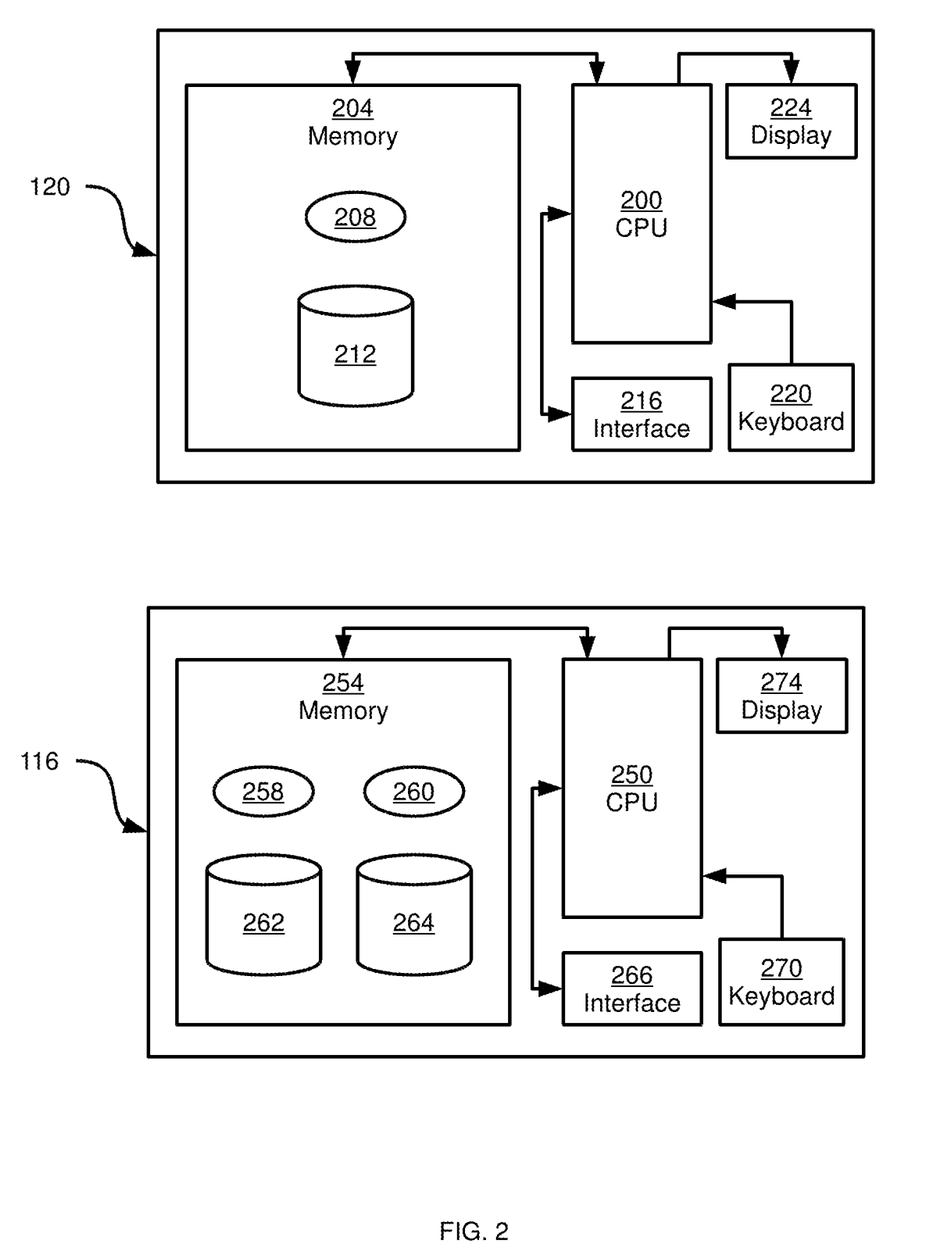
FIG. 2 depicts certain internal components of the messaging and integration servers of FIG. 1, according to a non-limiting embodiment.

Referring to FIG. 2, integration server 120 and messaging server 116 include respective central processing units (CPU) 200 and 250, also referred to herein as processors 200 and 250, interconnected with respective memories 204 and 254. Memories 204 and 254 each store computer readable instructions executable by processors 200 and 250 respectively. In particular, memory 204 stores an integration application 208 (also referred to herein as application 208), while memory 254 stores a message routing application 258 (also referred to herein as application 258) and an autonomous messaging application 260 (also referred to as a chat bot application 260, or simply as application 260). Processors 200 and 250, as well as memories 204 and 254, are generally each comprised of one or more integrated circuits (ICs), and can have a variety of structures, as will now occur to those skilled in the art (for example, more than one CPU can be provided for each server 116 and 120).

Processors 200 and 250 execute the instructions of applications 208, 258 and 260, respectively, to perform, in conjunction with the other components of servers 120 and 116, various functions related to the provision of services by servers 136 to the operators of client devices 104. In the discussion below of those functions, servers 116 and 120 are said to be configured to perform those functions, or to be operating to perform those functions.

Memory 204 stores an integration database 212 that includes content (that is, image data, text data and the like) corresponding to the services managed by servers 136. In some embodiments, database 212 can also contain session records that record various aspects of the interactions between client devices 104 and integration server 120. Memory 254, meanwhile, stores a message routing database 262 associated with application 258 and an autonomous message database 264 associated with application 260. Database 262 includes a record for each of a plurality of messaging account identifiers. Each record includes the messaging account identifier, and a current network address (e.g. an IP address) corresponding to that messaging account identifier. For example, each client device 104 may correspond to a messaging account identifier, and thus the network addresses of client devices 104a and 104b can appear in two distinct records in database 262. Via the execution of application 258, server 116 is configured to receive messages addressed to messaging accounts (the "addressees"). Server 116 routes each message to the current network address stored in database 262 that corresponds to the addressee.

Of particular note, application 260 itself is represented in a record in database 262. That is, certain messages received at server 116 from client devices 104 are routed not to other client devices, but are instead routed internally at server 116 for processing via the execution of application 260. Similarly, messages to be routed by application 258 can originate from application 260, rather than from client devices 104.

Autonomous message database 264, as will be described in greater detail below, contains data for use in autonomously responding to messages received from client devices 104. In addition, in some embodiments database 264 can include profile records each corresponding to a given messaging account (and therefore, typically, corresponding to a given client device 104).

Servers 120 and 116 also include respective network interfaces 216 and 266 interconnected with processors 200 and 250. Network interfaces 216 and 266 allow servers 120 and 116 to connect to network 108 via links 122 and 118, respectively. Network interfaces 216 and 266 thus include the necessary hardware, such as network interface controllers and the like, to communicate over the above links. Server 120 and 116 can also include each input devices interconnected with their processors, such as keyboards 220 and 270, as well as output devices interconnected with their processor, such as displays 224 and 274. Other input and output devices (e.g. a mouse, speakers) can also be connected to processors 200 and 250. Such input and output devices can be connected to processor 200 and 250 via network 108 and one or more other computing devices. In other words, the input and output devices can be local (as shown in FIG. 2) or remote.

The functions performed by integration server 120 and messaging server 116—in conjunction with other components of system 100—will now be discussed in detail.

Figure 3:
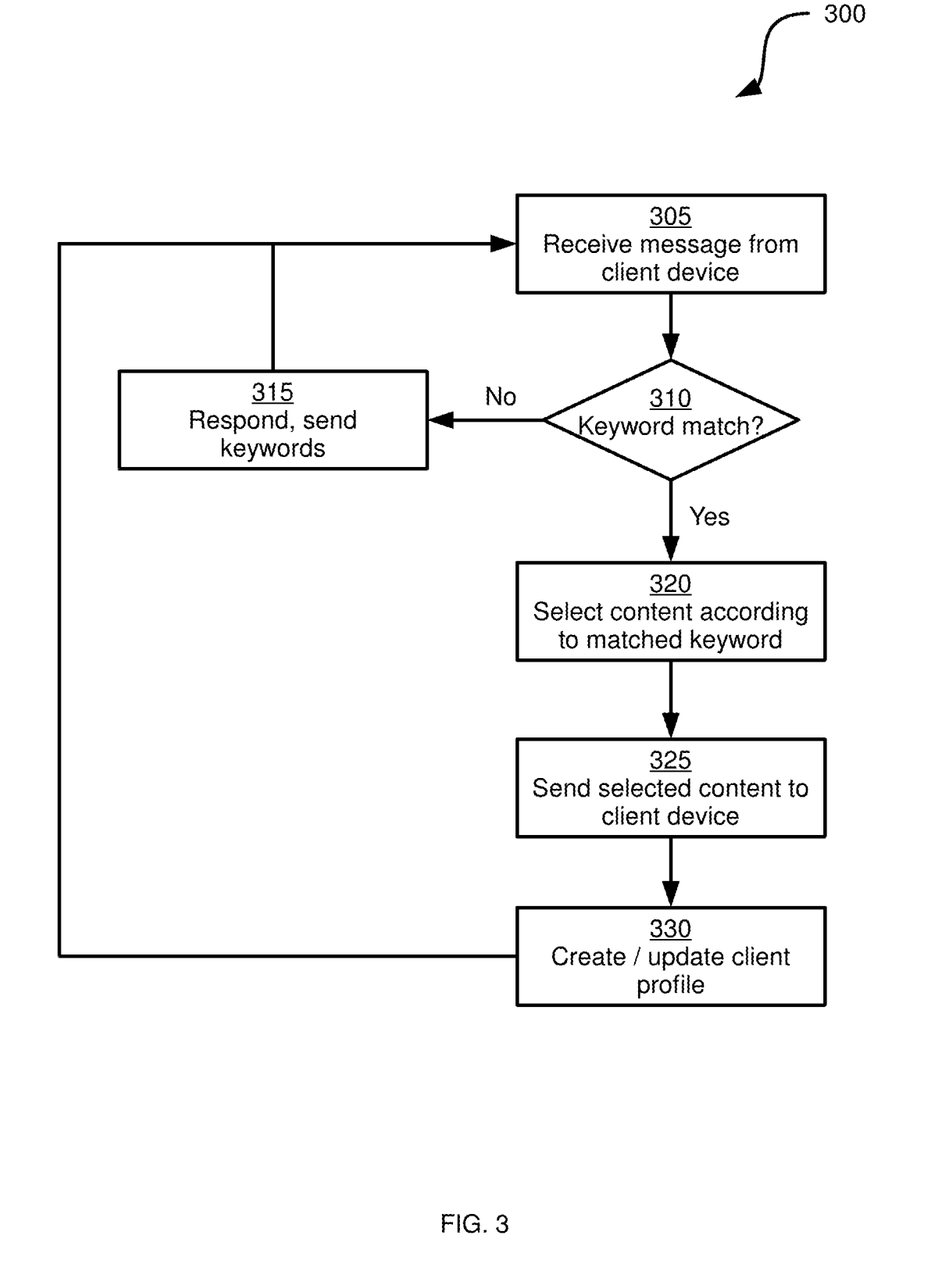
FIG. 3 depicts a method of autonomously processing messages, according to a non-limiting embodiment.
Figure 4A:
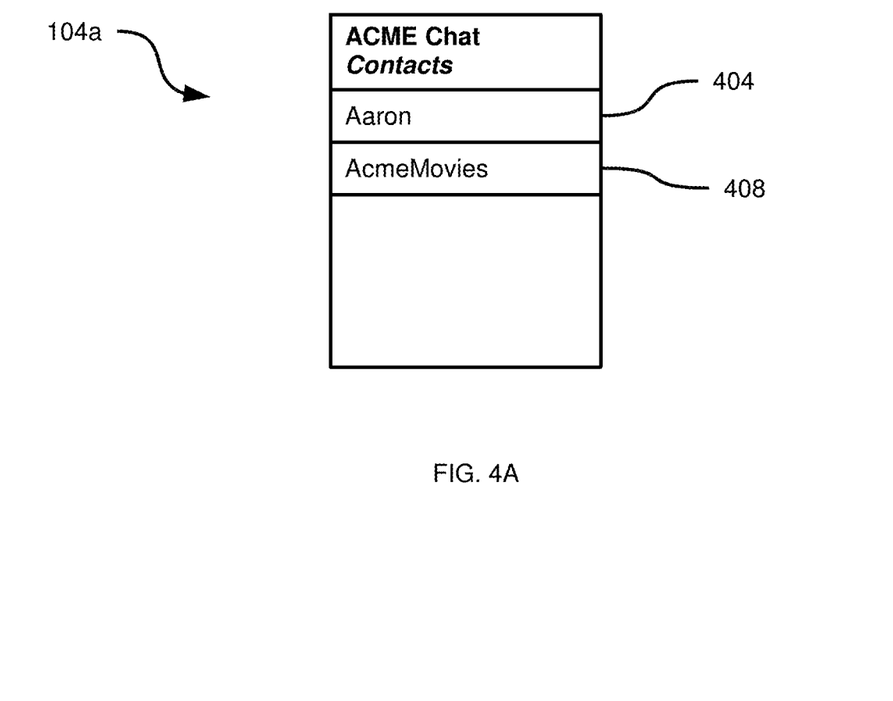
FIGS. 4A and 4B depict data presented by a client device of FIG. 1 during the performance of the method of FIG. 3, according to a non-limiting embodiment.

Turning to FIG. 3, a method 300 of autonomously processing messages is illustrated. Method 300 is performed by server 116, specifically via the execution of application 260. At block 305 of method 300, server 116 is configured to receive a message from a client device 104a. The message received at block 305 via the execution of application 260 is received via internal routing within server 116 through the execution of application 258. That is, the message is sent by client device 104a via network 108 and addressed to application 260. Server 116, executing application 258, retrieves the network address of application 260 (the addressee of the message) from database 262, and routes the message to application 260 based on that network address. Turning briefly to FIG. 4A, client device 104a is illustrated displaying a contacts interface via the execution of the above-mentioned messaging application ("ACME Chat"). Two contacts 404 and 408 are illustrated, each identifying a messaging account hosted at server 116. In the present example, it is assumed that contact 404 corresponds to client device 104b, while contact 408 corresponds to application 260 at server 116.

Figure 4B:
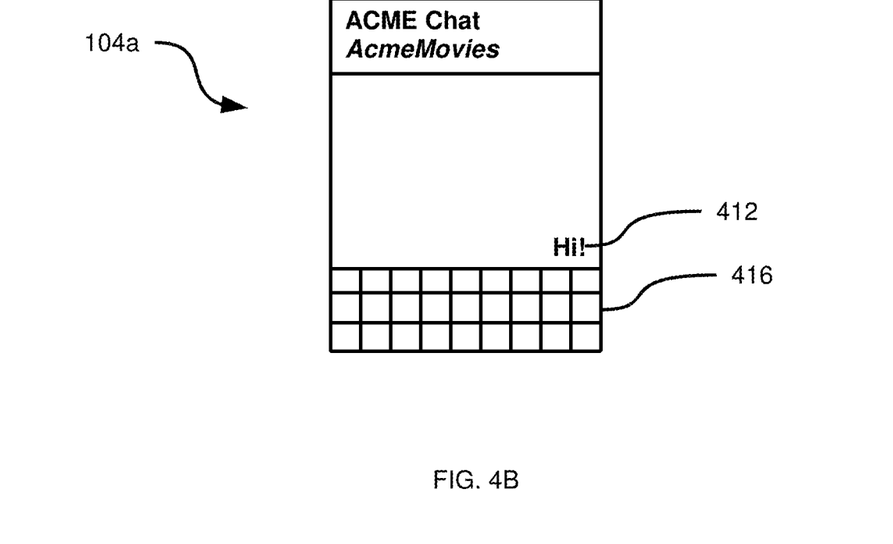

As shown in FIG. 4B, following a selection of contact 408 in FIG. 4A, a message composition interface is presented on the display of client device 104a, and a message 412 has been composed (e.g. via the receipt of input at a virtual keyboard 416 rendered on the display) and sent via network 108.

Returning to FIG. 3, having received the message at block 305, at block 310 server 116 is configured to determine whether the body of the received message (the string "Hi!" in the present example) matches any keywords stored in database 264. Database 264 stores a plurality of keywords and, in association with each keyword, an identifier of content corresponding to that keyword. As will be seen below, the content corresponding to each keyword is employed by server 116 in responding to the message received at block 305. An example of the keywords and associated content is shown below in Table 1:

TABLE 1

Example Keywords and Content

| Keyword | Content ID |
|---|---|
| Recommend | "What kind of movies do you like?" keywords [action, comedy, horror] |
| Showtimes | "Click the link below" URL [server120.com/showtimes] |
| Action | "Here is a movie you might like" select from [genre: action] |
| ... | ... |

Table 1 lists three keywords, and in connection with each keyword, one or more content identifiers. Although the keywords, "Recommend", "Showtimes" and "Action" are shown above, it is contemplated that a wide variety of other keywords can be stored in database 264 instead of, or in addition to, those shown above. The contents of database 264 is configurable, and thus at any time device 116 can receive input data (e.g. via keyboard 270) representing instructions to add new keywords, as well as modify or delete existing keywords. The nature of the keywords stored in database 264 is not particularly limited. Thus, for example, additional keywords in database 264 can include the names of movies or other goods or services, categories (e.g. "coming soon") of goods or services, and the like. Database 264 can also store a default keyword record containing a content identifier to be employed when no other keywords match the incoming message.

The content identifiers stored in connection with the keywords can represent the content itself, as in the case of the text strings shown above. (e.g. "Click the link below") and the list of keywords corresponding to the keyword "Recommend". Other content identifiers represent storage locations of the content (either elsewhere in memory 254 or at another computing device) or instructions for processing by application 260 to generate the content. For example, the content identifier "select from [genre: action]" is an instruction to server 116 to select one of a plurality of items of content data that are associated with a label (specifically, the label "action"). For example, database 264 can contain any suitable combination of image files (e.g. static or animated images such as .GIF files), video files (e.g. movie trailers), text files (e.g. movie plot summaries and other information) and the like each corresponding to a movie, and each bearing one or more labels (i.e. metadata).

In other embodiments, instead of, or in addition to, determining whether the received message matches keywords, server 116 can be configured to classify the received message to infer a keyword not explicitly present in the message. Various message classification technologies (e.g. neural networks, Bayes classifiers) will now occur to those skilled in the art for classifying incoming messages into, for example, a "recommend" class or a "showtimes" class based on the content of the message. In some embodiments, such classification, when used alongside explicit keyword matches, can be performed only when no explicit keyword matches are detected in the message.

Continuing with the performance of method 300, as will now be apparent, the determination at block 310 is negative, as the incoming message does not match any of the example keywords shown in Table 1. Therefore, at block 315 server 116 is configured to send a reply message to client device 104a containing one or more of the keywords stored in database 264. In some embodiments, all stored keywords can be returned to client device 104a, while in other embodiments, a null keyword can be defined as another record in Table 1, specifying a subset of keywords to be returned to the client device when the incoming message itself does not match any keywords.

Figure 5A:
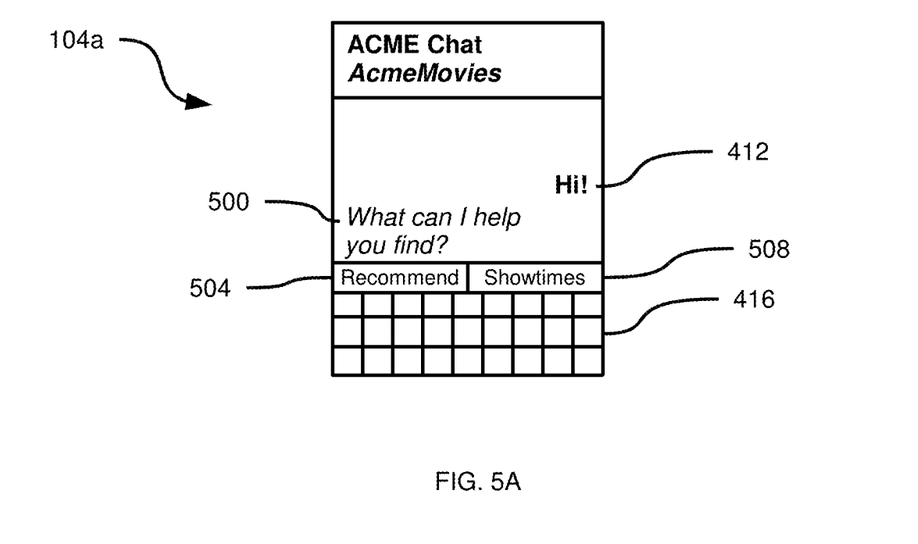
FIGS. 5A and 5B depict further data presented by a client device of FIG. 1 during the performance of the method of FIG. 3, according to a non-limiting embodiment.

The response sent at block 315 can also include any other predefined or dynamically generated (according to any suitable conventional chat bot response generation mechanisms) text string. Turning to FIG. 5A, an example response message is shown, as displayed at client device 104a following receipt of the message from server 116. In particular, the response message includes a text string 500, and selectable keywords 508. The messaging application at client device 104 is configured to present text string 500 in a conversation window along with message 412, and to present keywords 504 and 508 as selectable elements above virtual keyboard 416. Thus, keywords 504 and 508 are selectable at client device 104a to generate additional messages to server 116.

Figure 5B:
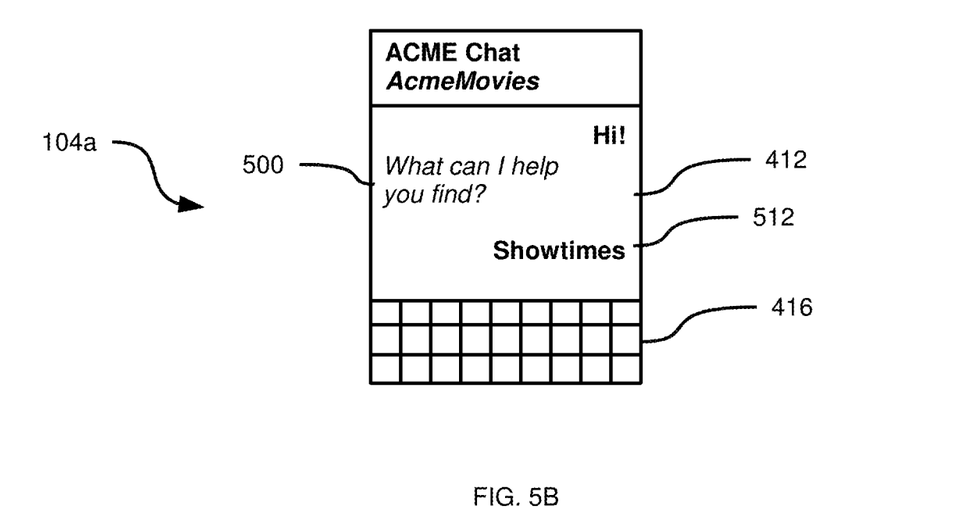

Returning to FIG. 3, after the performance of block 315, server 116 can return to block 305 to await a further message from client device 104a. In the present example, as shown in FIG. 5B, client device 104a receives a selection of keyword 508 ("Showtimes") and as a result, transmits that keyword in a message 512 to server 116. Message 512 is added to the conversation window along with messages 412 and 500.

Having received the above-mentioned second message, server 116 repeats the performance of block 310, and determines that the incoming message does match a keyword from database 264. Therefore, performance of method 300 proceeds to block 320. At block 320, server 116 is configured to select content for a response message from database 264 based on the keyword detected in the message received at block 305. In the present example, referring to Table 1, the content corresponding to the keyword "Showtimes" includes a text string and a URL identifying server 120.

Figure 6:
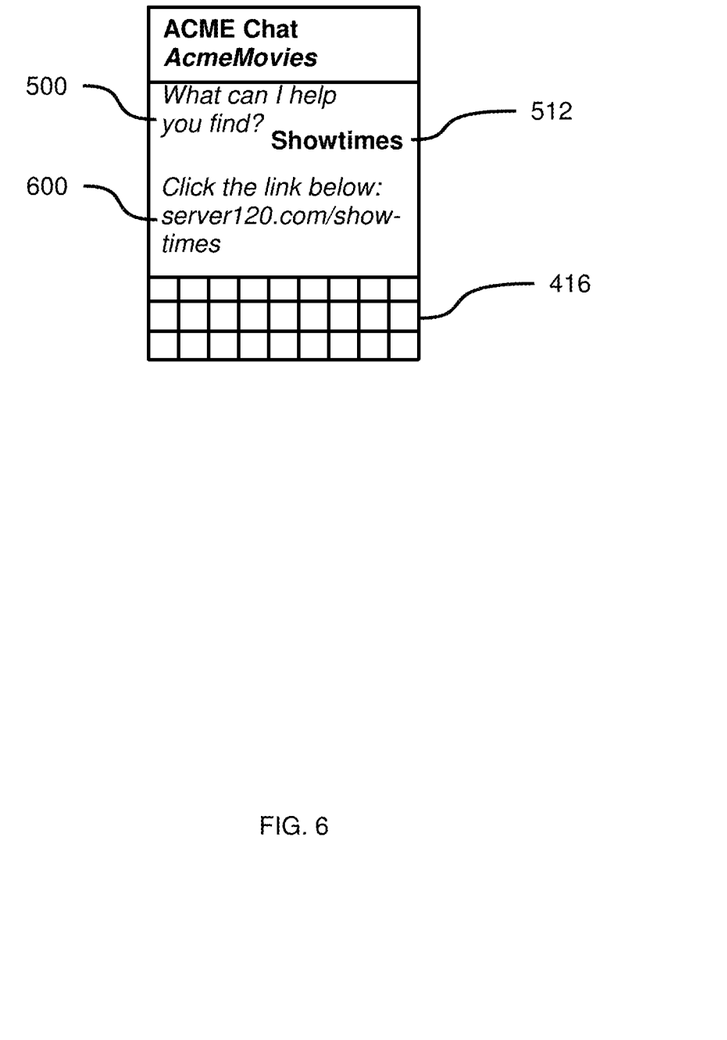
FIG. 6 depicts additional data presented by a client device of FIG. 1 during the performance of the method of FIG. 3, according to a non-limiting embodiment.

At block 325, server 116 is configured to send a response message to client device 104a (which is routed via the execution of application 258, as noted earlier) including the selected content. FIG. 6 illustrates the response message 600 as displayed at client device 104 following receipt from server 116. Although FIG. 6 illustrates the URL as being displayed at client device 104a, it will now be apparent that the URL need not be explicitly visible. For example, the text string itself (e.g. "Click here") can be encoded with a hyperlink tag rendering the text string selectable without displaying the URL. In other embodiments, the hyperlink can be encoded in an image. In further embodiments, the selection of the "Showtimes" keyword need not lead immediately to the receipt of a URL at client device 104a. Instead, for example, database 264 can include additional records containing keywords defining various times of day that are transmitted to client device 104*a* for selection, prior to redirecting client device 104*a* to integration server 120 as discussed below.

Following transmission of the message, at block 330 server 116 is configured to update a client profile stored in database 264 (or create a profile if none exists) with an indication of the keyword match detected at block 310. It is contemplated that when a client profile is available, server 116 can be configured to select the content at block 320 based in part on the profile. For example, The "Recommend" keyword can correspond to content selected from a set of labelled content based on previously selected genre keywords (e.g. "Action") instead of a prompt to select a genre keyword as shown in Table 1.

Client profiles can also include a variety of additional data, including, for example, the current location of each client device 104—client devices 104 can be configured to report their current locations to server 116 at preconfigured intervals.

Based on the client profiles corresponding to each client device 104, server 116 can also be configured to transmit messages to client devices 104 without having received messages at block 305. For example, server 116 can be configured to automatically select content (e.g. a movie trailer video file, an animated image file such as a .GIF file, or any other information) corresponding to keywords previously transmitted to server 116 by a given client device 104, and transmit the content to that client device 104. Such automatic transmissions of content can be initiated by server 116 at preconfigured intervals, or in response to instructions from an administrator of server 116. As an example, an administrator of server 116 may instruct server 116 to select a plurality of client devices 104 that (as evidenced by their client profiles) have expressed a preference for the "action" genre and are within a certain threshold distance of a predefined location (e.g. the location of a movie theatre). Server 116 can then be instructed to transmit a message to each selected client device 104 containing promotional content (e.g. a trailer or poster, a discount coupon for movie tickets, and the like) for an upcoming movie or other event.

Referring again to FIG. 6, client device 104*a* receives a selection of the URL in message 600. Following selection of the URL, client device 104*a* is configured to execute a browser application (which can be integrated with the messaging application, or can be a separate application) and transmit a request to the computing device identified by the URL. In the present embodiment, the URL identifies integration server 120. In other words, under certain conditions, server 116 is configured, via the transmission of messages processed by a messaging application at client device 104*a*, to redirect client device 104*a* to integration server 120. The functionality of integration server 120 will be discussed below in greater detail.

Figure 7:
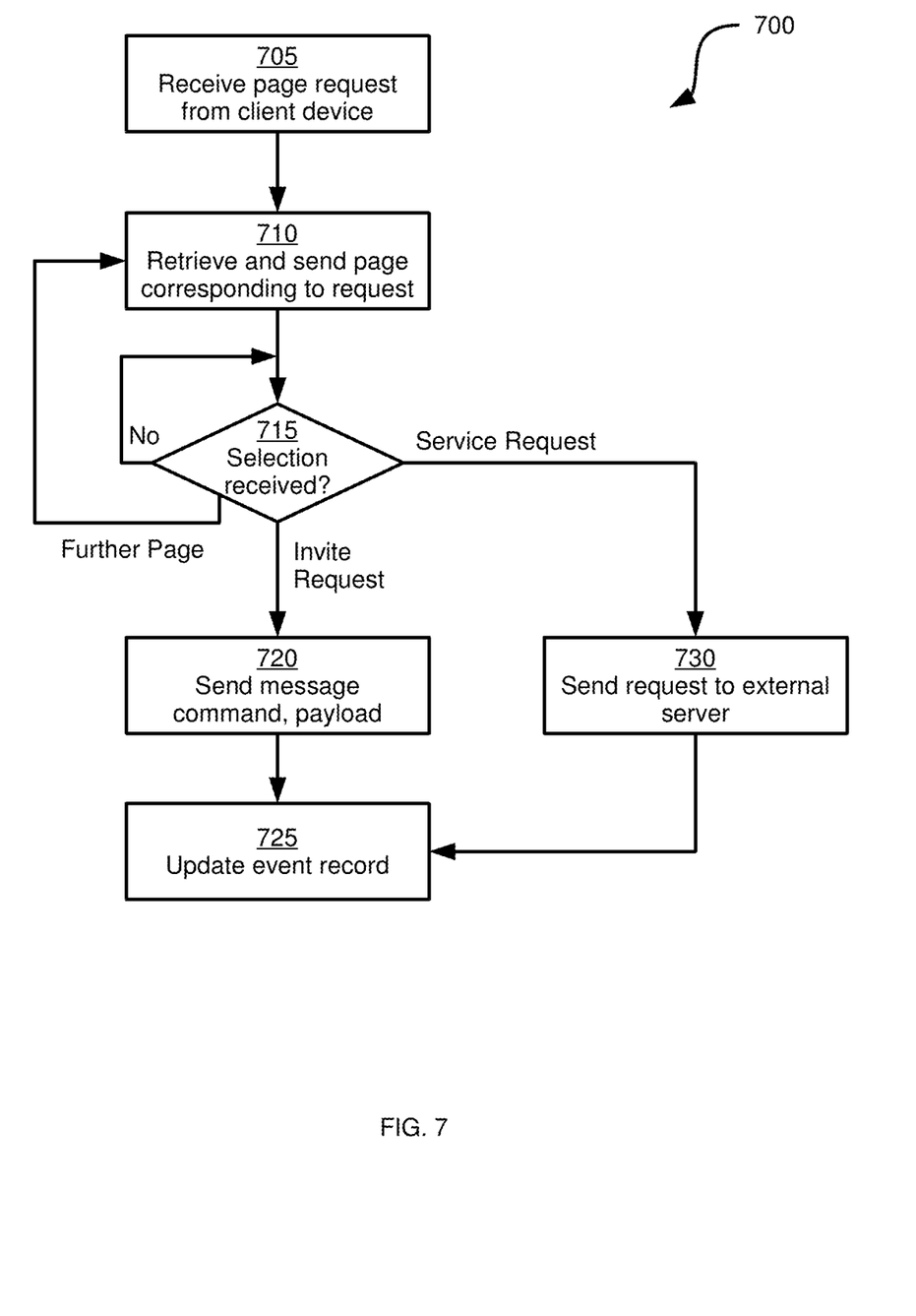
FIG. 7 depicts a method of processing client requests at the integration server of FIG. 1, according to a non-limiting embodiment

Turning to FIG. 7, a method 700 of processing client requests at integration server 120 is illustrated. At block 705, server 120 is configured to receive a request from a client device 104. In the present example performance of method 700, the request received at block 705 is a request transmitted by client device 104*a* upon selection of the URL shown in message 600 of FIG. 6. As will now be apparent to those skilled in the art, the URL identifies a web page hosted at integration server 120. That is, integration server 120 includes functions corresponding to those implemented by conventional web servers.

Figure 8A:
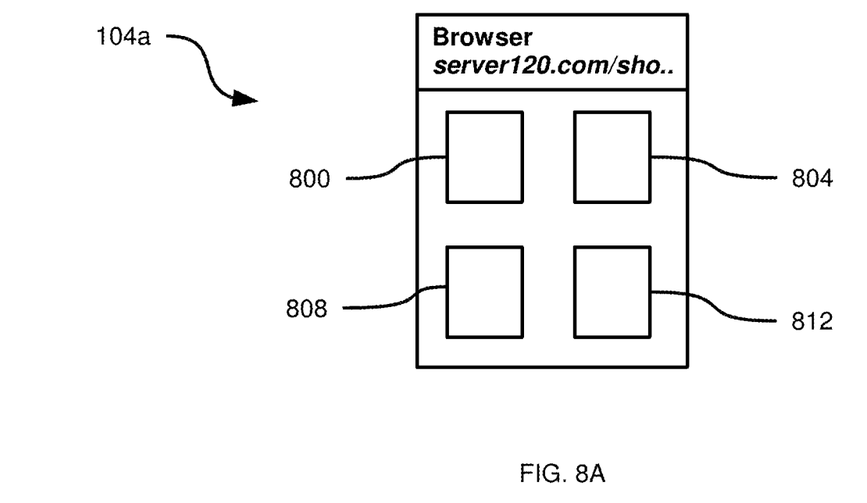
FIGS. 8A and 8B depict data presented by a client device of FIG. 1 during the performance of the method of FIG. 7, according to a non-limiting embodiment.

At block 710, in response to the request, integration server 120 is configured to retrieve and send the web page identified in the request from block 705 to client device 104*a*. The act of retrieving the web page can include requesting data from other servers (including servers 136 shown in FIG. 1), as well as dynamic generation of portions of the web page via the execution of one or more scripts at integration server 120. An example web page is shown in FIG. 8A, as displayed at client device 104*a*. As shown in FIG. 8A, the web page includes a plurality of selectable elements 800, 804, 808 and 812. In the present example, the selectable elements represent movies, although a wide variety of other selectable elements can be employed.

At block 715, server 120 is configured to determine whether a selection of one of the selectable elements in the web page has been received from client device 104*a*. In other words, server 120 is configured to determine whether an additional request has been received from client device 104*a* indicating selection of one of elements 800, 804, 808 and 812. When the determination is negative (i.e. no further requests have been received), server 120 awaits a selection at block 715. When a selection has been received, server 120 takes one of several actions based on the nature of the selected element.

In the present example, client device 104*a* selects element 800 (i.e. sends a message to server 120 indicating a selection of element 800). Element 800 is, in the present example, a link to another web page hosted at server 120 but could alternately be a graphic containing the desired information to be directly displayed on device 104*a* (including an animated graphic such as an animated GIF, or short video clip, etc), a suitable combination of text and graphics, etc. Therefore, in response to such a selection, server 120 is configured to return to block 710 and retrieve and send the requested web page or other appropriate information to client device 104*a*. In other embodiments, rather than retrieving and sending a new page, server 120 can be configured to send an updated version of the previously transmitted web page.

Of particular note, the request from client device 104*a* indicating a selection of element 800 can include a location of client device 104*a*. The performance of block 710, therefore, can include retrieving some or all of the web page based on the location received from client device 104*a*. In the present embodiment, server 120 is configured to retrieve event data—such as movie listings and show times—from event data server 128, based on the location received from client device 104*a* and an identifier of the element selected by client device 104*a*. The event data retrieved from event data server 128 is transmitted to client device 104*a* in a further performance of block 710.

Figure 8B:
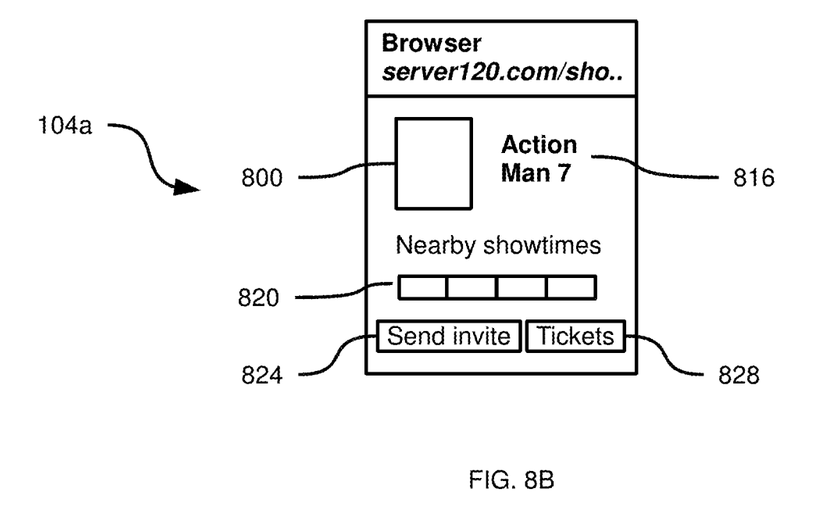

The results of the above (second) performance of block 710 are shown in FIG. 8B. In addition to element 800 (which was selected at client device 104*a*), additional data associated with element 800 is shown, such as a title 816 corresponding to element 800. The web page received at client device 104*a* from integration server 120 also includes a plurality (four, in the present embodiment) of showtimes for the movie represented by element 800. Each selectable showtime element 820 defines a location (e.g. a movie theatre), and a time and date (e.g. 4:30 pm on December 22). In addition, the web page includes a selectable invitation element 824, and a selectable ticket purchase element 828. Other service-related elements are also contemplated, such as transportation (e.g. taxi booking) elements and concession stand purchase elements.

Following the display of the web page shown in FIG. 8B, client device 104a can be configured to receive a selection of a showtime element. The selection of a showtime element, in the present embodiment, does not result in the transmission of a request to server 120. Rather, the selected showtime element is stored in memory at client device 104a for use in a subsequent request, as described below.

Following selection of a showtime element 820, client device 104a can receive a selection of invitation element 824, which causes client device 104a to send a further request to server 120. In addition to the indication that element 824 has been selected, the previously selected showtime element 820 is identified in the request.

Returning to FIG. 7, through a further performance of block 715, server 120 determines that the above-mentioned request has been received, indicating a selection of invitation element 824 in association with one of the showtime elements. In response to receiving the request, server 120 proceeds to block 720, at which a message is returned to client device 104a including a messaging command and a message payload. Although the message from server 120 is received at client device 104a via the browser application, the messaging command is an instruction to client device 104a to execute the messaging application and compose a message including the payload. In general, the payload is a URL corresponding to a web page hosted by integration server 120. For example, integration server 120 can be configured, responsive to selection of invitation element 824, to create a unique instance of the web page that includes an indication of the selected showtime element 820. The URL, therefore, can identify that unique web page.

Upon receipt of the command and payload, client device 104a is configured to execute the messaging application to display the contacts interface of FIG. 4A. Responsive to selection of a contact from the interface, client device 104a is configured to present a message composition interface (as shown in FIG. 4B), and to prepopulate the message composition interface with the above-mentioned payload. Following transmission of the message (including at least the payload, including the URL of the unique, event-specific web page generated by integration server 120) to the selected contact (e.g. Aaron, corresponding to client device 104b), the message is routed by server 116 to the addressee.

Thus, in the present example, client device 104b receives a message from client device 104a, including at least a URL identifying the event-specific web page generated above at server 120. Prior to discussing the activities of client device 104b and integration server 120, block 725 of method 700 will be discussed.

At block 725, after provided the message command and payload to client device 104a, integration server 120 can be configured to update an event record corresponding to the unique URL. For example, the event record can include the URL itself, and an identifier of client device 104a. In some embodiments, the identifier can be the messaging identifier of client device 104a (that is, the identifier of the messaging account associated with client device 104a).

Figure 9:
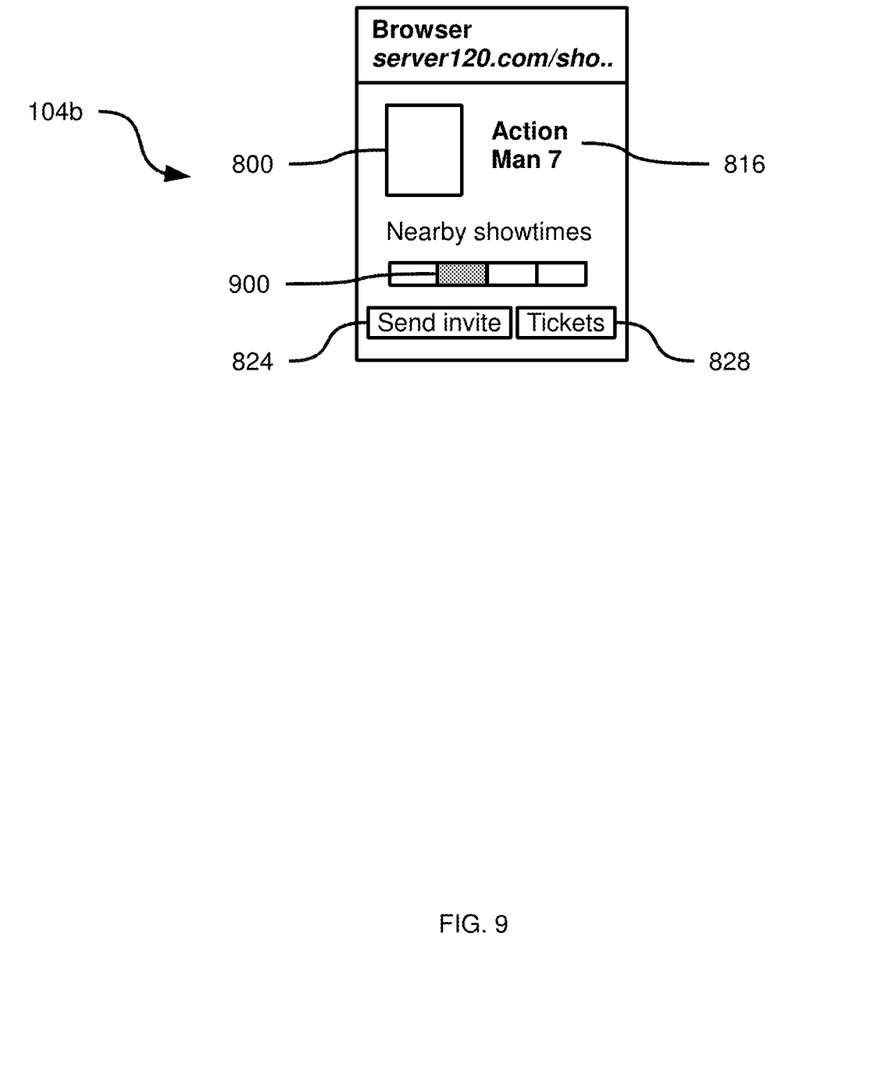
FIG. 9 depicts further data presented by a client device of FIG. 1 during the performance of the method of FIG. 7, according to a non-limiting embodiment.

Client device 104b may, upon receipt of the above-mentioned invitation message, select the URL included in the message payload. As a result, client device 104b transmits a request to server 120 for the unique URL, which is received at block 705. At block 710, the unique event-specific web page is transmitted to client device 104b. FIG. 9 illustrates the display of the web page at client device 104b, including the selected showtime (i.e. selected previously by client device 104a), as well as the selectable elements 824 and 828. Selection of invitation element 824 by client device 104b leads to a repetition of the invitation procedure mentioned above, with the exception that an additional unique web page need not be generated at server 120. Instead, the same unique URL can be passed to client device 104b for transmission to another client device via the messaging application and server 116.

Selection of service element 828 at client device 104b (or any other client device viewing the above-mentioned unique web page) leads to the performance of block 730. In some embodiments, prior to block 730 additional web pages may be provided to client device 104b by server 120, for example to prompt client device 104b for payment data (e.g. credit card information). In other embodiments, however, server 120 may store such payment data in memory 204, and thus selection of element 828 leads directly to the performance of block 730. At block 730, server 120 is configured to send a service request to an external computing device, such as service provider server 136-1. The request includes an identifier of the previously selected showtime element (900, as shown in FIG. 9), as well as the payment data. In other words, the request sent at block 730 is a request to purchase one or more tickets to the selected movie showing on behalf of client device 104b. The request can be transmitted to any conventional service provider server 136 via any suitable application programming interface (API).

Following confirmation of the service request sent at block 730, server 120 is configured to update the event record associated with the unique web page at block 725. In particular, as noted earlier, client device 104b may be configured to send (e.g. with the selection of element 828) a messaging identifier corresponding to client device 104b. The event record may therefore be updated to indicate not only that (as described earlier) client device 104a has sent an invitation, but also that client device 104b has purchased a ticket.

As will now be apparent, further client devices can receive invitations to the same event (via receipt of the above unique URL), and the event record at server 120 can be further updated through repeated performances of method 700. Server 120 can be configured to take various actions on the basis of the event record. For example, the web page itself can be updated to display portions of the event record, such as a list of all messaging account identifiers that have contacted server 120 in connection with the unique URL. Further, in some embodiments, server 120 can be configured to transmit an instruction to messaging server 116, and specifically to application 260. The instruction can cause server 116 (via the execution of application 260) to transmit a message to one or more of the client devices 104 listed in the event record at server 120. The message can notify, for example, the initial inviting party (client device 104a) of the identities of the other client devices 104 that have purchased tickets to the movie.

Other performances of block 730 can result in the transmission of a service request to server 136-2, which in the present embodiment is operated by a transportation service provided (e.g. a taxi dispatcher). Thus, in some embodiments, the unique web page can include a selectable element for requesting transportation to the movie of other event. Server 120, based on the event record and the selected showtime, as well as the current location of the requesting client device 104, can transmit a request to server 136-2 including a pickup location (the location of the client device), a drop-off location (the location of the theatre defined by the selected showtime), and a pickup time. Server 120 can determine the pickup time based on the start time of the movie and a distance between the client device's location and the theatre location.

In further embodiments, server 120 can be configured to delay the instruction sent at block 730 until the required pickup time has been reached. For example, certain transportation services are not capable of receiving instructions defining future pickup times. Instead, all instructions are interpreted by such services as requests for immediate pickup. Therefore, server 120 can determine a future time at which to transmit the request at block 730, rather than transmitting the request with a future pickup time.

In still further embodiments, server 120 can be configured to modify instructions to external service providers based on the above-mentioned event record. For example, a request sent at block 730 to transportation service provider server 136-2, although initiated by a single client device 104, can include a plurality of client device locations when the event record indicates that a plurality of client devices have purchased tickets to the event. As a further example, a request transmitted at block 730 to another service provider server to pre-purchase items at a theatre concession stand can be modified to represent a discount price based on the number of client devices 104 identified in the event record as having purchased tickets.

In other embodiments, messaging server 116 can be configured to perform additional actions prior to handling client messages via the execution of application 260 (beginning at block 305). For example messaging server 116 can be configured to execute a plurality of distinct chat bot applications, and to store autonomous message databases for each application. One of the chat bot applications may be referred to as a directory chat bot; messages received by the directory application can be compared to a database to detect keywords in client messages that correspond to various products or services (e.g. movies, food, clothing and the like). Upon detection of such a keyword, the directory application can return the identifier of another chat bot application, such as application 260 discussed above. In other words, the content identifiers in the directory application's database can include identifiers of the other chat bot applications. Following receipt of a chat bot identifier, a client device 104 can initiate communications with the corresponding chat bot, which can be processed as described above.

In further embodiments, some or all of the functionality implemented by integration server 120 is implemented directly by messaging server 116 via the execution of application 260. For example, data such as showtimes, rather than resulting in redirection of client device 104 to integration server 120, can be stored directly in database 264. Showtimes and other content may be updated dynamically by server 116, e.g. via an application programming interface (API) exposed by event data server 128 for that purpose.

In such embodiments, rather than responding to client device requests for showtimes with content including a selectable URL, server 116 can retrieve the requested content directly from database 264 and transmit the content to client device 104 as described above. Further, server 116 can be configured to respond to the selection of a given showtime (that is, each showtime can be transmitted to client device 104 as a selectable keyword) by providing client device 104 with additional keywords, also defined in database 264, for purchasing tickets, inviting other users, and the like, as described above in connection with integration server 120.

The scope of the claims should not be limited by the embodiments set forth in the above examples, but should be given the broadest interpretation consistent with the description as a whole.

I claim:
1. A system, comprising:
a messaging server connected to a network; and
an integration server connected to the messaging server via the network; the messaging server configured to:
route messages between a plurality of client devices; and
autonomously generate responses to at least one of the messages received from at least one of the client devices, by selecting content based on the at least one message and sending the content to the at least one client device, the content identifying a web page hosted at the integration server;
the integration server configured to:
receive a request for the web page from the at least one client device;
responsive to receiving the request, send the web page, including at least one selectable element;
responsive to receiving a selection of the selectable element from the client device, generate and store a unique instance of the web page, identified by a unique URL and transmit a message command to the client device, for causing the client device to transmit a message to the messaging server containing a web page identifier; and
send a message payload to the client device with the message command, the message payload including the unique URL.

2. The system of claim 1, the message command containing an identifier of a messaging application executed at the at least one client device.

3. The system of claim 2, the message command further containing an identifier of a contact selection interface within the messaging application.

4. The system of claim 1, the integration server further configured to:
generate and store an event record containing the unique URL and an identifier of the client device.

5. The system of claim 4, the integration server further configured to:
receive a request for the unique URL from a further client device; and
responsive to receiving the request, transmit the instance of the web page to the further client device.

6. The system of claim 5, the integration server further configured to:
receive a selection of a selectable element of the instance of the web page from the further client device; and
update the event record to include an identifier of the further client device.

7. The system of claim 6, the integration server further configured to:
update the instance of the web page to include the identifiers of the client device and the further client device.

8. The system of claim 1, the integration server further configured to:
receive selection of a service request element in the instance of the web page from the client device; and
responsive to the selection of the service request element, transmit a service request to an external server.

9. A method, comprising:
at a messaging server connected to a network:
   routing messages between a plurality of client devices; and
   autonomously generate responses to at least one of the messages received from at least one of the client devices, by selecting content based on the at least one message and sending the content to the at least one client device;
   the content identifying a web page hosted at an integration server connected to the messaging server via the network;
at the integration server:
   receiving a request for the web page from the at least one client device;
   responsive to receiving the request, sending the web page, including at least one selectable element;
   responsive to receiving a selection of the selectable element from the client device, generating and storing a unique instance of the web page, identified by a unique URL and transmitting a message command to the client device, for causing the client device to transmit a message to the messaging server containing a web page identifier; and
   send a message payload to the client device with the message command, the message payload including the unique URL.

10. The method of claim 9, the message command containing an identifier of a messaging application executed at the at least one client device.

11. The method of claim 10, the message command further containing an identifier of a contact selection interface within the messaging application.

12. The method of claim 9, further comprising, at the integration server:
   generating and storing an event record containing the unique URL and an identifier of the client device.

13. The method of claim 12, further comprising, at the integration server:
   receiving a request for the unique URL from a further client device; and
   responsive to receiving the request, transmitting the instance of the web page to the further client device.

14. The method of claim 13, further comprising, at the integration server:
   receiving a selection of a selectable element of the instance of the web page from the further client device; and
   updating the event record to include an identifier of the further client device.

15. The method of claim 14, further comprising, at the integration server:
   updating the instance of the web page to include the identifiers of the client device and the further client device.

16. The method of claim 9, further comprising, at the integration server:
   receiving a selection of a service request element in the instance of the web page from the client device; and
   responsive to the selection of the service request element, transmitting a service request to an external server.

17. A method in a messaging server, comprising:
   storing a plurality of content records in a memory, each content record containing event data defining an event, wherein the event data is associated with a web page;
   periodically retrieving updated event data from an event data server and updating the content records;
   receiving a message from a client device via a network;
   based on the received message, selecting one of the content records and transmitting at least a portion of the event data to the client device.

18. A messaging server, comprising:
   a memory storing a plurality of content records, each content record containing event data defining an event, wherein the event data is associated with a web page;
   a network interface; and
   a processor interconnected with the memory and the network interface, the processor configured to:
      periodically retrieve updated event data from an event data server via the network interface and update the content records;
      receive a message from a client device via the network interface;
      based on the received message, select one of the content records and transmit at least a portion of the event data to the client device.

* * * * *